United States Patent [19]

Newmark et al.

[11] Patent Number: 4,717,987
[45] Date of Patent: Jan. 5, 1988

[54] COMPACT NON-METALLIC LOAD CENTER ENCLOSURE

[75] Inventors: Larry J. Newmark, Avon; David A. Hibbert, Tolland, both of Conn.

[73] Assignee: General Electric Company, New York, N.Y.

[21] Appl. No.: 26,503

[22] Filed: Mar. 16, 1987

Related U.S. Application Data

[63] Continuation-in-part of Ser. No. 907,250, Sep. 15, 1986.

[51] Int. Cl.$^4$ ............................................. H02B 1/04
[52] U.S. Cl. ................................. 361/351; 174/65 G; 361/363
[58] Field of Search ............... 361/395, 369, 379, 363, 361/65 G, 351

[56] References Cited

U.S. PATENT DOCUMENTS 1,031,368  7/1912  Perry ..................................... 52/543
3,801,875  4/1974  Morby et al. ................. 174/72 B X
4,266,683  5/1981  Sellinger ....................... 174/65 R X Primary Examiner—A. D. Pellinen
Assistant Examiner—Morris Ginsburg
Attorney, Agent, or Firm—Richard A. Menelly; Walter C. Bernkopf; Fred Jacob

[57] ABSTRACT

A molded plastic load center enclosure permits the circuit breakers contained therein to be compactly aligned on one side of the enclosure. The insulative properties of the plastic allows the circuit breaker branch straps to be mounted on the bottom and side walls of the enclosure. The end of the bottom-mounted branch strap is formed for direct connection with the line terminals. The end of the side-mounted branch strap is apertured for convenient connection with the line terminals. Metallic attachment caps are pressed within the bottom of the enclosure to facilitate mounting to a support post.

6 Claims, 6 Drawing Figures

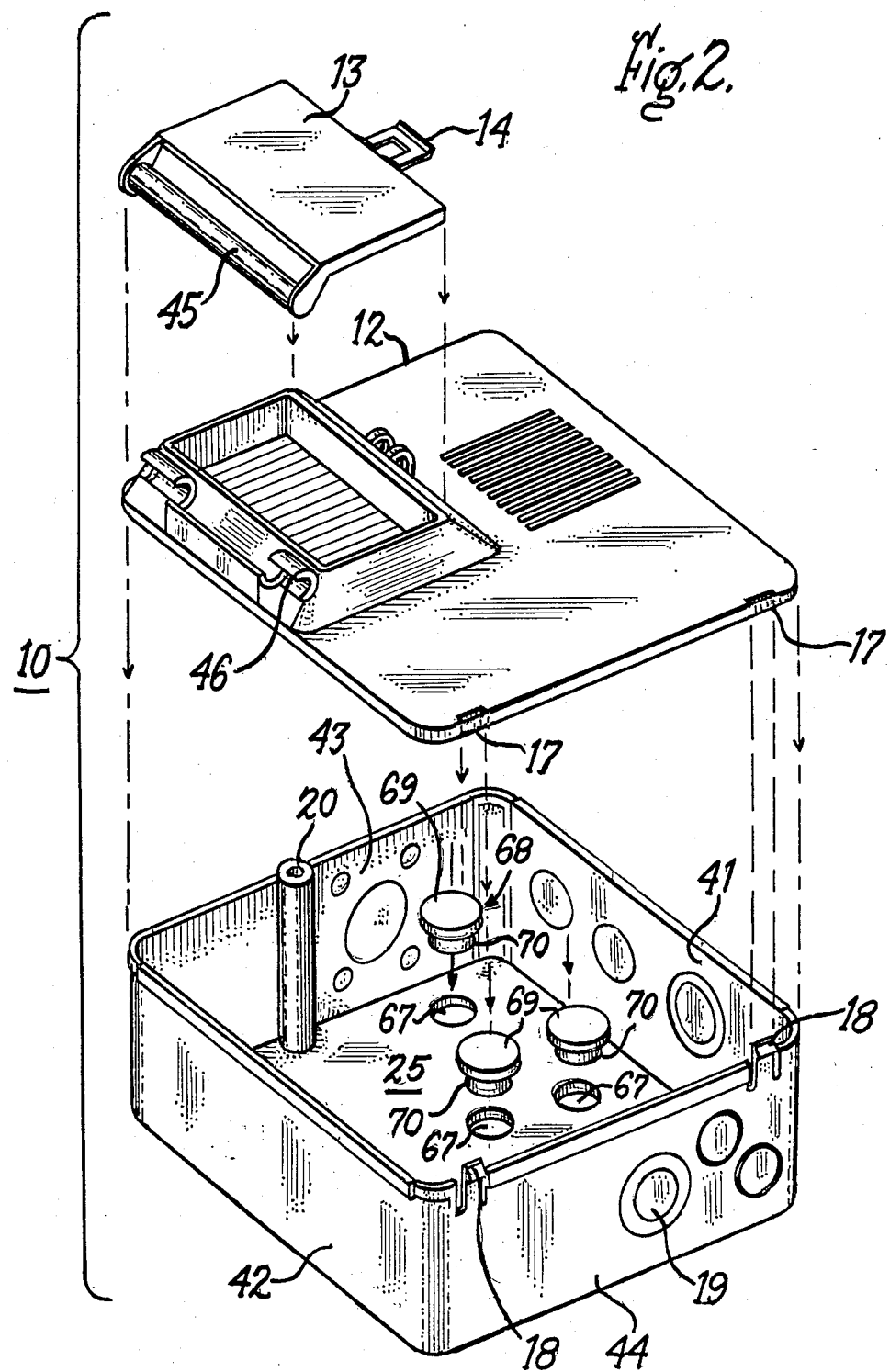

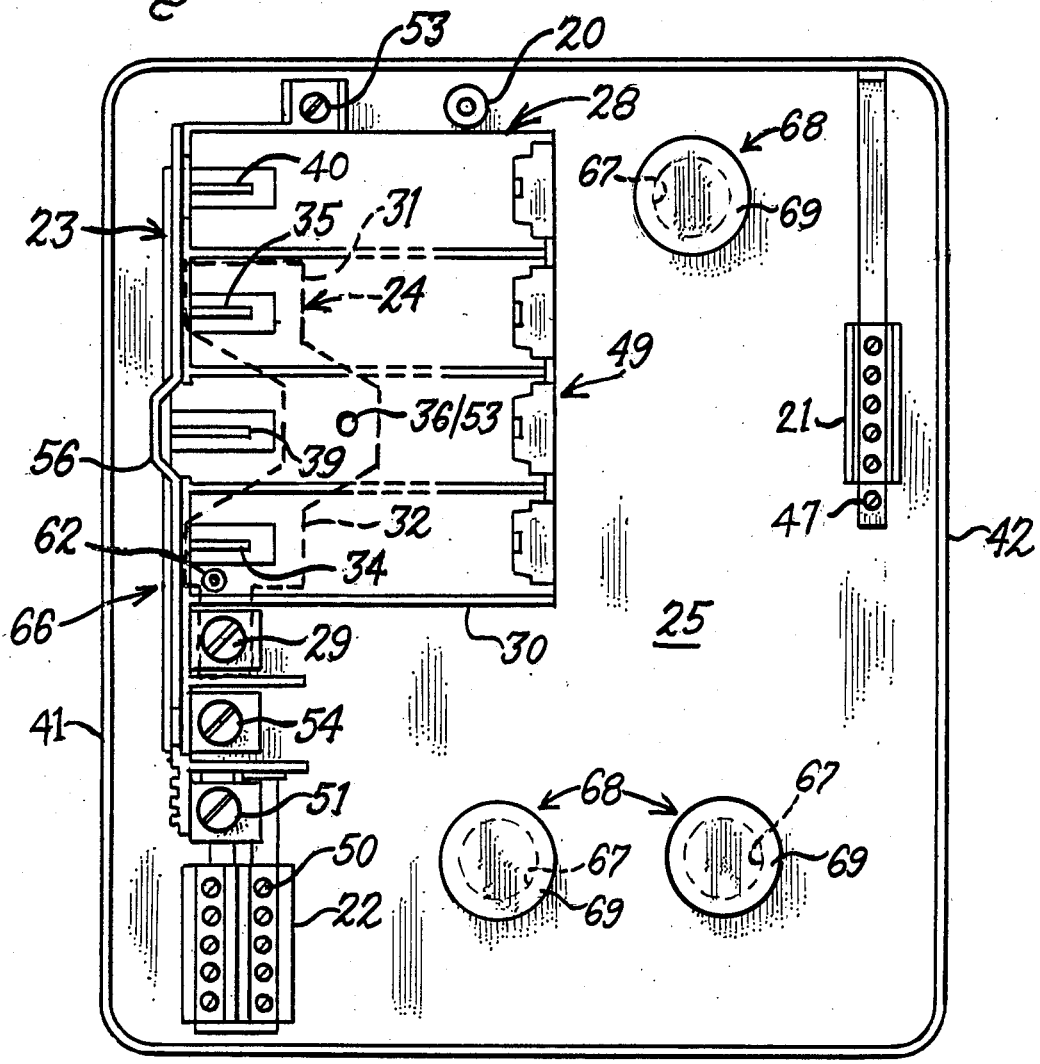

COMPACT NON-METALLIC LOAD CENTER ENCLOSURE

CROSS-REFERENCE TO RELATED APPLICATION

This is a continuation-in-part of U.S. patent application Ser. No. 907,250, filed Sept. 15, 1986.

BACKGROUND OF THE INVENTION

U.S. Pat. No. 3,801,875, entitled "Non-Metallic Load Center With Improved Bus Bar Construction", describes a molded plastic load center wherein the plastic case includes circuit breaker and branch strap mounting means integrally formed therein. The insulative properties of the plastic allows the circuit breakers to be compactly arranged without fear of electrical breakdown between the breakers or the terminal connections. The circuit breaker branch straps are mounted on the bottom surface of the plastic enclosure. Access to the terminal connections is made by unscrewing the cover from the case and lifting the cover away from upstanding tabs integrally formed within the case.

U.S. patent application Ser. No. 874,755, filed June 16, 1986, entitled "Molded Plastic Enclosure For Electric Service Apparatus", describes one such enclosure including an access door mounted on the cover for convenient access to the circuit breakers contained therein. A locking hasp is integrally formed on the door for padlocking the door against unauthorized access.

U.S. patent application Ser. No. 811,716, filed Dec. 20, 1985, entitled "Molded Plastic Enclosure For Disconnect Switches", wherein an access door is formed within the cover and hasp means are integrally formed within the cover for the arrangement of a padlock to prevent unauthorized access. The switches contained within the enclosure are of the type used with air conditioning disconnects. Both aforementioned patent applications are incorporated for reference purposes and should be reviewed for a good description of the relationship between the molded plastic door, cover and case used for housing both circuit breakers and electric switches.

Although non-metallic load centers have found limited application over the past few years, wide market acceptance has not, as yet, been realized mainly due to the lower cost of comparable metallic load centers as well as the ease afforded in mounting the metallic load centers to support walls. An explosive powder-actuated tool or "stud gun" has not heretofore been used with plastic load centers because of the fracturing of the plastic caused by the radial tensile forces on the plastic material at the sides of the driven nail as well as the compressive forces applied to the plastic material under the driven nail head.

The purpose of the instant invention is to describe a molded plastic enclosure for circuit breakers wherein the three plastic enclosure components are formed on automated equipment and wherein the metallic components are inserted by means of a completely automated process. It has since been determined that the savings realized by complete automation results in a molded plastic circuit breaker enclosure that is less expensive than comparable metallic circuit breaker enclosures. The use of a shaped metallic cap inserted within holes formed through the back of the enclosure allows the use of stud guns mount the enclosure to a support post or stud without damaging the plastic material.

SUMMARY OF THE INVENTION molded plastic enclosure for circuit breakers wherein the three plastic components are formed by means of a speed injection molding process and wherein the non-metallic components are capable of robotic assembly in a completely automated process. The arrangement of a two-component orthogonal branch strap, one part on the bottom of the enclosure and the other part mounted on a side wall allows the circuit breakers and other electrical components to be robotically assembled. The enclosure includes a plurality of stud mounting caps inserted within holes through the back of the enclosure to facilitate the use of a stud gun to attach the load center to a support post or stud.

BRIEF DESCRIPTION OF THE DRAWINGS

FIG. 2 is a top perspective view in isometric projection of the door, cover and case of the load center depicted in FIG. 1;

FIG. 3 is a plan view of the load center of FIG. 1 with the door and cover removed;

DESCRIPTION OF THE PREFERRED EMBODIMENT

Figure 1:
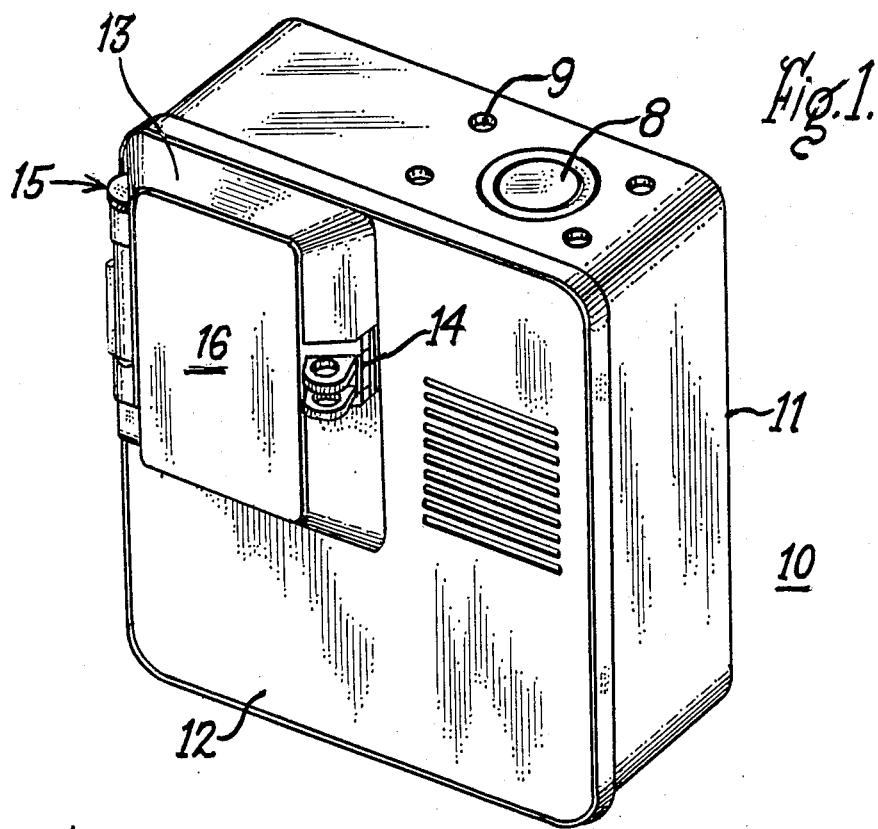
FIG. 1 is a front perspective view of the compact non-metallic load center according to the invention.

A molded plastic load center 10 is shown in FIG. 1, wherein a plastic case 11 is attached to a plastic cover 12 to which a plastic door 13 is mounted by means of a hinge assembly 15. A locking hasp 14 is integrally formed on the door and the door face 16 can be transparent for viewing the ON-OFF condition of the circuit breakers contained therein. Four screw holes 9 are formed through the top of the case to facilitate connection to an electric cable conduit through the electrical access hole 8 formed therein.

Figure 6:
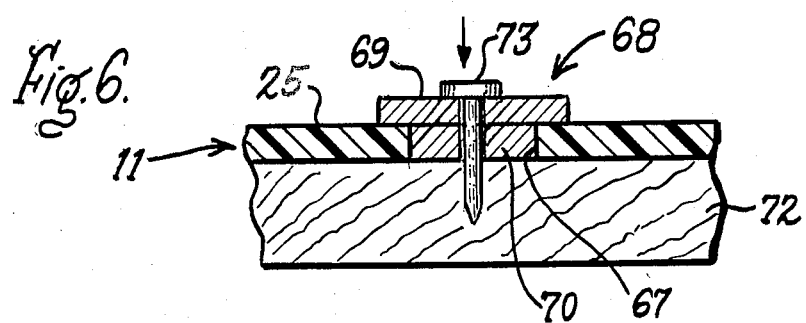
FIG. 6 is a side view, in partial section, of a part the enclosure nailed to a support post.

As shown in FIG. 2, the load center housing 10 is formed from three different injection molded parts. The case comprises a pair of opposing side walls 41, 42 joined by top and bottom end walls 43, 44 and a bottom 25. A plurality of knockouts 19 are integrally formed within the side walls and the end walls of the case for passage of electrical cable. A mounting post 20 is intergrally formed within the case for receiving a screw to attach the cover 12 after insertion of the integrally formed tabs 18 in the case within the slots 17 formed in the edge of the cover. Thru-holes 67 are formed through the bottom 25 to allow for the insertion of stud mounting caps 68. The flanged rims 69 of the caps project over the edges of the holes when the cylindrical stems 70 of the caps are inserted therein to prevent any damage to the plastic material in the vicinity of the caps when the support nails are explosively driven through the caps. To prevent fracture of the plastic material, it is important that the ends of the stems 70 be coextensive with the exterior surface of the bottom 25 or extend beyond the exterior surface thereof when a nail 73 is later driven through the caps to attach the enclosure to a support post or stud 72, as shown in FIG. 6. The door 13 is next attached by snappingly inserting the hinge pin 45 within the complementary curvilinear protrusions 46 integrally formed in the cover.

Figure 4:
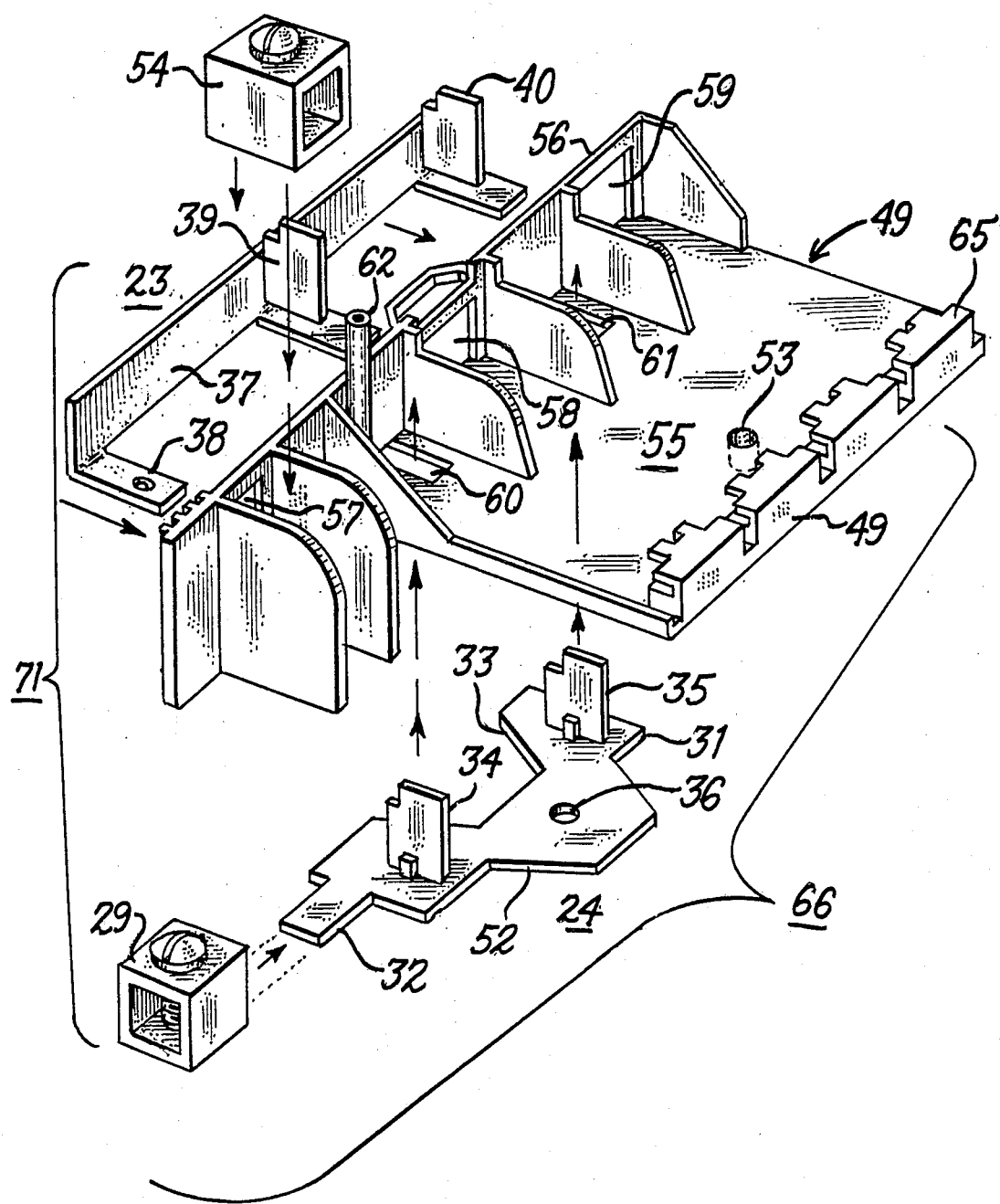
FIG. 4 is a top perspective view in isometric projection of the components used within the circuit breaker support structure shown in FIG. 3.

Prior to the attachment of the door and cover to the case, the electrical components are inserted within the case as depicted in FIGS. 3 and 4. The ground terminal connectors 21 are attached to the bottom 25 of the case by means of machine screws 47. A circuit breaker support assembly 66 consisting of insulative circuit breaker support 49 and an orthogonal composite branch strap assembly 71 is then attached within the case in the following manner. The orthogonal composite branch strap assembly 71 consisting of a side assembly 23 and a bottom assembly 24 are arranged proximate the side wall 41 of the case. The bottom assembly 24 is first attached to the plastic insulating circuit breaker support 49 and a terminal lug 29 is arranged over one end. The side assembly 23 is positioned against the insulative support side 56 so that the circuit breaker stabs 34, 35 on the bottom branch strap assembly extending through openings 60, 61 in the support bottom 55 are interposed with the circuit breaker stabs 39, 40 on the side assembly 23, and a terminal lug 54 is arranged over one end. The neutral terminal bar 22 containing the neutral terminal screws 50 and neutral terminal lug 51 is then attached to the side of the circuit breaker support 49 to complete the assembly.

As shown in FIG. 4, the bottom assembly 24 comprises a shaped copper bar 31 which includes a rectangular extension 32 for insertion within the terminal lug 29 and with a pair of upstanding circuit breaker stab connectors 34, 35 brazed or welded thereon. A U-shaped cutout 33 is formed in one side of the shaped copper bar and a locating hole 36 is formed through the U-shaped extension 52 on the opposite side thereof. The bottom assembly 24 is positioned on the underside of the support bottom 55 by means of a pin 53 projecting from underneath the support. The side assembly 23 comprises a separate rectangular copper bar 37, having a pair of circuit breaker stab connectors 39, 40 welded or brazed to one side and with a terminal connector 38 formed near the end of the bar. The insulative circuit breaker support 49 is formed from a single molding process into the support bottom 55 and the vertically extending support side 56. The terminal connector 38 on the side assembly 23 extends through a slot 57 formed through the side support and the circuit breaker stabs 39, 40 extend through the slots 58, 59. Once the back assembly is positioned against the support side 56, the terminal lug 54 is then fastened to the terminal connector 38 to retain the back assembly against the side support. The bottom assembly 24 is arranged underneath the support bottom 55 by positioning the locating hole 36 on the bottom assembly over the pin 53 extending from the support bottom 55 and passing the stabs 34, 35 on the bottom assembly through complementary slots 60, 61 formed through the support bottom 55. The terminal lug 29 is then fastened to the extension 32 to retain the bottom assembly against the support bottom. A support and guide post 62 is integrally formed within the top of the back support 56. The circuit breakers (not shown) are mounted on the insulative support 49 by means of integrally formed circuit breaker mounting hooks 65.

Figure 5:
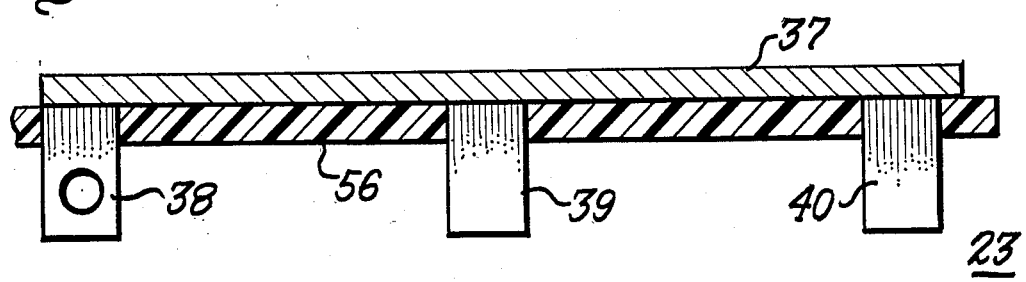
FIG. 5 is a top sectional view of a part of the circuit breaker support structure detailed in FIG. 4.

In FIG. 5, the side assembly 23 is shown attached to the support side 56 with the copper bar 37 arranged on one side of the support side and with the circuit breaker stabs 39, 40 and the terminal connector 38 extending through the support side.

The required properties of the plastic materials used to form the circuit breaker insulative support 49 to meet local and national standards include heat resistance, flame retardance, mechanical impact resistance, electrical resistance and chemical resistance. Such materials include either a modified polyphenylene oxide resin, a modified polybutylene terepthalate resin or a modified polyethylene terepthalate resin.

A compact molded plastic circuit breaker enclosure has thus been described wherein the enclosure is formed from three separate injection molding pieces and wherein the circuit breaker branch strap assembly is inserted therein by means of a downloaded automatic assembly process. The automatic assembly features of the loadcenter make the loadcenter economically competitive with existing state-of-the-art metallic load center enclosures. Stud mounting caps are also described, which allow attachment of the enclosure to a support post or stud at a construction site by means of an explosive powder actuator tool without damaging the plastic material of the enclosure.

Having thus described our invention, what we claim as new and desire to secure by Letters Patent is:

1. A molded plastic load center comprising:
   a plastic cover removably attached to a plastic case;
   a plastic circuit breaker support comprising a slotted planar bottom support and an apertured upright back support;
   an orthogonal branch strap assembly comprising;
      a first circuit breaker branch strap supported by said bottom support and having a plurality of first circuit breaker stab connectors extending perpendicular from said first branch strap through said slotted bottom support;
      a second circuit breaker branch strap supported by said back support and having a plurality of second circuit breaker stab connectors extending perpendicular from said second branch strap through said apertured back support, said second circuit breaker stab connectors being interposed with said first circuit breaker stab connectors; and
   further comprising at least one thru-hole formed through a bottom of said plastic case and a stud gun metal mounting cap inserted within said thru-hole.

2. The molded plastic load center of claim 1 wherein said mounting cap comprises a hollow metal stem member closed at one end and terminating at an opposite end in a flanged rim extening outboard of said stem.

3. A molded plastic enclosure comprising:
   a plastic cover removably attached to a plastic case;
   means integrally formed within said case for supporting a plurality of electrical components therein;
   electrical access means formed within said case for providing electrical access to said components when said cover is closed against said case;
   attachment access means formed within a bottom of said case; and
   shaped metal support caps within said attachment access means allowing explosively driven nails through said support caps to hold said enclosure to a support wall.

4. The molded plastic enclosure of claim 3 wherein said shaped metal caps include a cylindrical stem member and a flange, said stem member extending within said attachment access means and said flange being retained by an interior surface on said case bottom.

5. The molded plastic enclosure of claim 4 wherein said stem member is coextensive with an exterior surface of said case bottom.

6. The molded plastic enclosure of claim 4 wherein said stem member extends beyond an exterior surface.

* * * * *